United States Patent [19]

Robin

[11] 4,056,439
[45] Nov. 1, 1977

[54] SECONDARY HEAT TRANSFER CIRCUITS FOR NUCLEAR REACTOR PLANT

[75] Inventor: Marcel Robin, Sevres, France

[73] Assignee: Commissariat a l'Energie Atomique, Paris, France

[21] Appl. No.: 714,374

[22] Filed: Aug. 16, 1976

[30] Foreign Application Priority Data

Aug. 22, 1975 France .................. 75.26039

[51] Int. Cl.² ............................................. G21C 15/02
[52] U.S. Cl. ........................................ 176/65; 176/40
[58] Field of Search .................. 176/40, 50, 62, 63, 176/64, 65

[56] References Cited

U.S. PATENT DOCUMENTS

| | | | |
|---|---|---|---|
| 3,425,907 | 2/1969 | Bonsel et al. .................. | 165/107 X |
| 3,498,880 | 3/1970 | Gollion ............................. | 165/107 X |
| 3,716,451 | 2/1973 | Van Sickel et al. .................. | 176/65 |
| 3,793,143 | 2/1974 | Muller .................................. | 176/62 X |
| 3,850,232 | 11/1974 | Wanka et al. ..................... | 165/107 X |
| 3,932,214 | 1/1976 | Aubert et al. ............................ | 176/65 |
| 3,956,063 | 5/1976 | Johnson et al. ..................... | 176/65 X |

Primary Examiner—Peter A. Nelson
Attorney, Agent, or Firm—McNenny, Pearne, Gordon, Gail, Dickinson & Schiller

[57] ABSTRACT

A secondary heat transfer circuit for a nuclear reactor comprises a steam generator module, an intermediate heat exchanger, and a pump which circulates a heat transfer liquid, e.g. liquid sodium, between the heat exchanger and the steam generator module. The steam generator module includes a central return duct for cold heat transfer liquid and the pump intake is directly connected to the central duct. In a modification, a plurality of steam generator modules are connected to a single duct.

7 Claims, 8 Drawing Figures

SECONDARY HEAT TRANSFER CIRCUITS FOR NUCLEAR REACTOR PLANT

The present invention relates to an improvement to the secondary circuits of a nuclear reactor, particularly but not exclusively of the fast neutron type, each of which circuits forms the link between an intermediary exchanger, where a heat-transfer liquid, such as liquid sodium for example, acquires calories supplied by the primary coolant of the reactor itself, which is heated as it traverses the core, and a steam generator in which the sodium arriving from the intermediary exchanger causes the vapourisation and the super-heating of another liquid, usually water, the steam produced then being expanded in an installation for the production of electricity.

In the construction forms known at the present time, the steam generator for each secondary circuit is arranged on the outside of the sealed building which contains the protective container of the reactor, which in turn encloses the core in a vessel containing the coolant. The circulation of the sodium in this secondary circuit is effected by a pump, usually situated on the pipework which returns the cold sodium leaving the steam generator to the intermediary exchanger.

The present invention concerns an improvement to the design of the secondary circuits of a nuclear reactor, aimed particularly at making them more compact in order to effect a considerable saving in the length of piping which is required, the drainage and sodium expansion tanks, and the buildings which house them, thus reducing the associated investment.

To this end, the improvement concerned is characterised in that the steam generator is designed to include a central duct for returning the cold sodium, and the circulation of this sodium in the circuit is effected by a pump, the intake of which is connected directly to the central duct of the generator.

It is advantageous if the unit formed by the steam generator and the circulation pump is mounted in a sealed cell, the walls of which are resistant to fire, impact and pressure, and which is integral with the building which contains the reactor, the link with the intermediary exchanger in the secondary circuit being formed by pipes which pass leak-tight through the wall of the building. In particular, these pipes are associated with a passage through the wall using expansion bellows.

According to circumstances, the circulation pump is arranged above the central duct of the generator or is located inside this duct.

The arrangements according to the invention thus allow a considerable reduction in the size and complexity of the pipework, ducting, couplings and so on, used in conventional circuits, by reducing in particular the number of loops required. In these circumstances, each secondary circuit, as far as most of its constituent parts are concerned (pump, steam generator, pipework, tanks ....) is housed in a smaller volume, which results in substantial savings in the quantity of special steels required for the construction of this circuit, as well as in the civil engineering installations of the reactor.

Other characteristics of the invention will become apparent again in the course of the following description of an example of its implementation, given by way of indication and not definitive, with reference to the attached Drawings, where:

Figure 1:
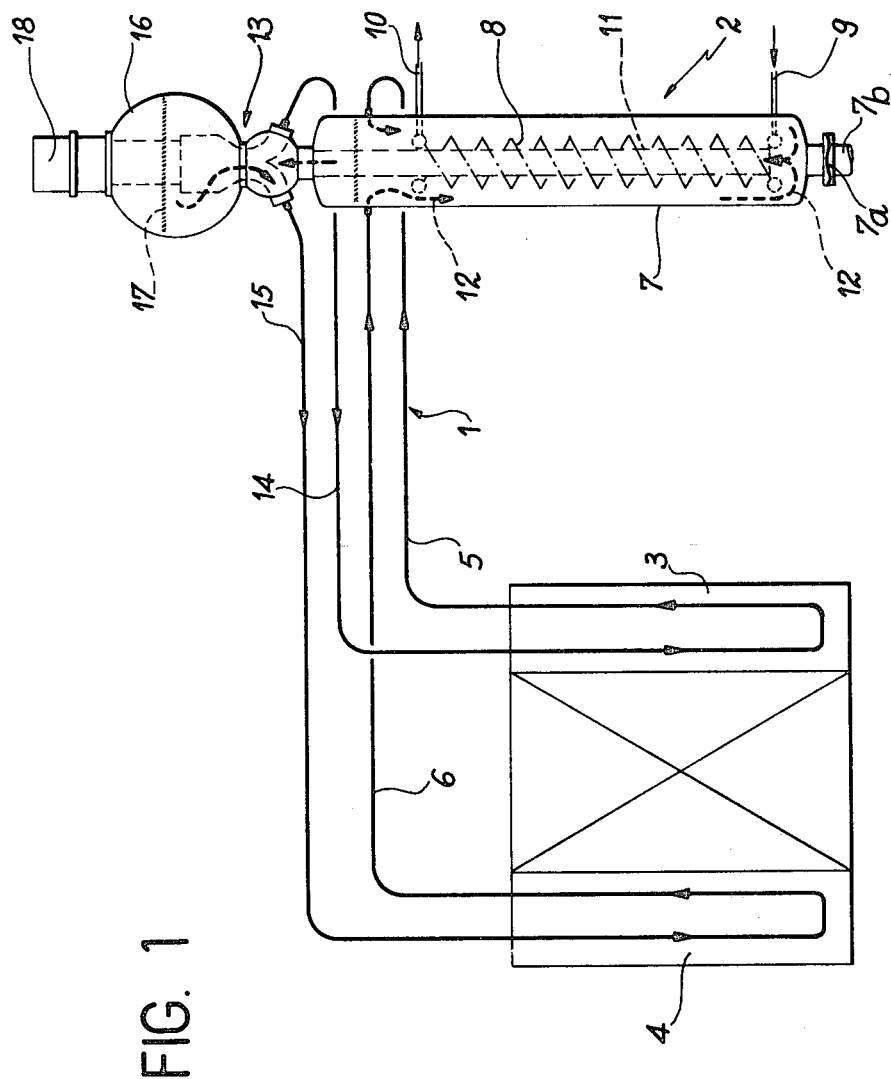
FIG. 1 shows schematically the principle of the arrangement according to the invention for the elements of a secondary circuit of a fast neutron nuclear reactor.

In FIG. 1, reference 1 designates the whole of a secondary circuit for a fast neutron nuclear reactor which forms the link between at least one intermediary exchanger and a steam generator, and through which flows a heat-transfer liquid, which is normally sodium. In the version shown in this example, the steam generator 2 envisaged is designed to collect the sodium discharged from two intermediary exchangers 3 and 4, operating in parallel. The supply pipes 5 and 6 respectively for the hot sodium leaving the intermediary exchangers 3 and 4 open out in the upper part of the casing 7 of the steam generator arranged with its axis vertical. In this, the sodium circulates from the top to the bottom in contact with an arrangement of coiled pipes such as 8, shown schematically in the Drawing, through which water flows, which is liquid, vapourised and then superheated as it passes through the generator. Pipes 9 and 10 represent the inlet for the water into the casing 7 and the vapour outlet.

The casing 7 of the generator includes a central duct 11 for returning the cold sodium from the bottom towards the top of the generator, the path of the sodium being shown schematically by the arrows 12. In the example shown here, the top end of the central duct 11 is connected outside the casing 7 and just above the generator, to the intake orifice of a circulation pump 13 which pumps this sodium back towards the intermediary exchangers 3 and 4 via the pipes 14 and 15 respectively. Normally, the pump 13 is immersed in an expansion tank 16 inside which the level of the sodium 17 is covered by a protective layer of a neutral gas. A motor 18 for operating the pump is shown in the upper part of the tank 16.

Figure 2:
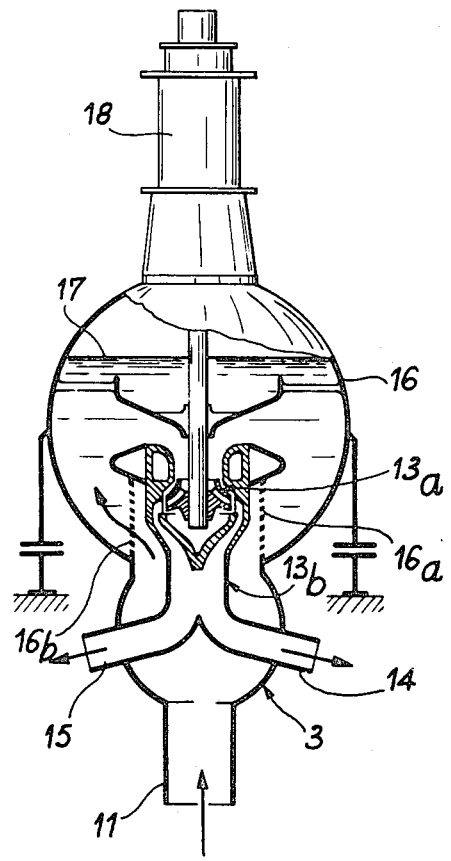
FIGS. 2 and 3 are schematic sectional views on a larger scale of two different construction forms of the pump used in the circuit according to FIG. 1.

FIG. 2 shows in more detail the construction of the pump 13 and of its expansion tank 16; the impellor 13a of the pump directly pumps the cooled sodium leaving the steam generator through the axial duct 11 to collect in the tank 16 after passing through inlet passages 16a formed in a guide tube 16b.

The sodium pumped by the impellor 13a is admitted to a distributor 13b, from whence it is supplied in parallel to pipes 14 and 15, returning towards the primary exchangers.

Figure 3:
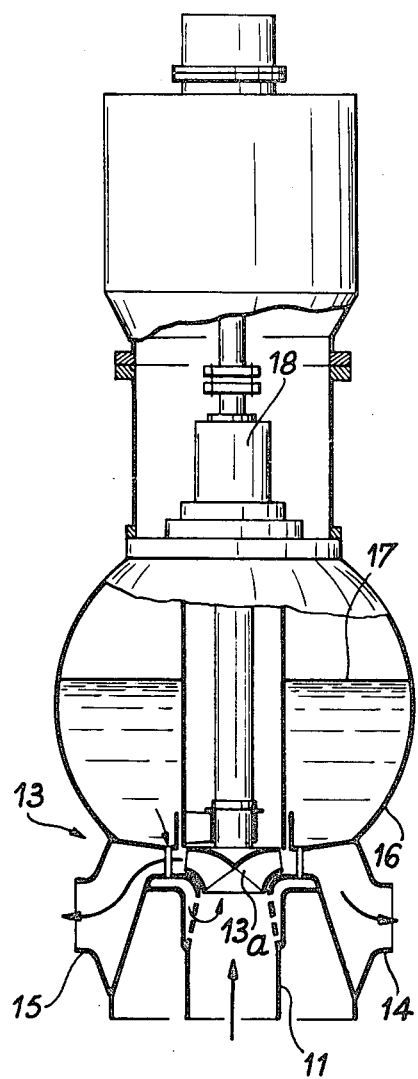

In another implementation version, illustrated in FIG. 3, the pump 13 is arranged so that the expansion tank 16 is situated above the impellor 13a of the pump, the sodium in this tank therefore being virtually stagnant, which has the advantage of restricting the oscillations in the mass of liquid metal in the circuit in the event of accidental sodium-water reaction in the steam generator, and protects the expansion tank and the mechanical components of the pump. In this version, the impellor 13a of the pump is rotated relative to its position in the previous solution, so that it sucks in directly the sodium arriving from the central duct 11, to send it on further under pressure in the pipes 14 and 15.

In either of the two instances given above, where the return of the sodium towards the pump 13 is no longer carried out by pipework coming from the bottom of the casing 7 of the steam generator as in the conventional solutions, it is possible to site an evacuation outlet at this point, fitted with a safety membrane 7a and connecting pipework 7b which makes it possible to collect the sodium from the casing, and the products of a possible reaction between the sodium and the water in the pipes 8 in the event of a leak on one or more of these, ensuring total and rapid drainage of the generator, and limiting the maximum pressure inside its casing. It should be noted that a solution of this kind has the advantage of virtually instant rupturing of the safety membrane in the event of a sodium-water reaction in any part of the steam generator, the shock wave produced in the circuit giving an over-pressure which exceeds the resistance threshold of this membrane.

Figure 4:
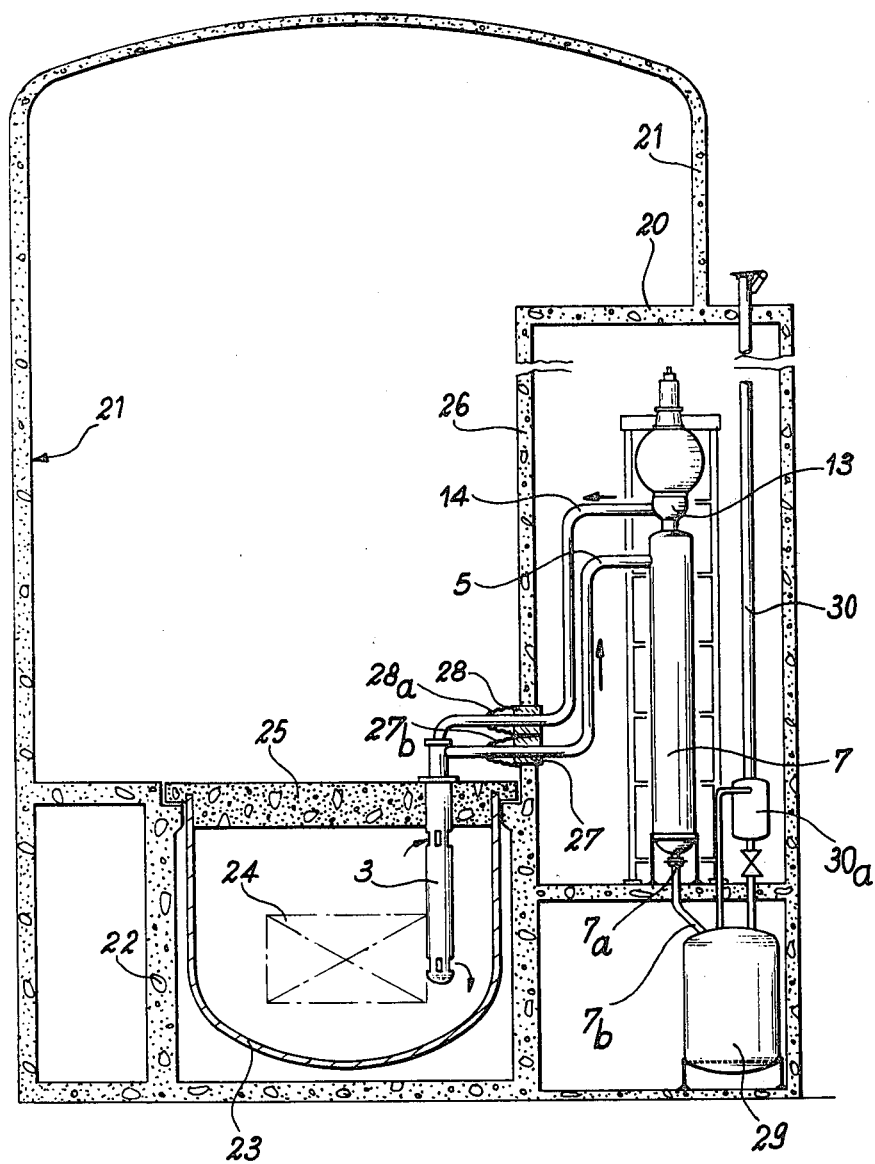
FIG. 4 is a schematic, sectional front view of the building containing the reactor and of a cell associated with this building, which encloses the steam generator and its circulation pump.

Referring now to FIG. 4, it can be seen how the unit formed by the casing 7 of the steam generator and the pump 13 connected to the latter immediately at the outlet of its central duct 11, can be mounted in a cell 20 integral with a sealed building 21 containing the protective container 22 of the reactor.

This container surrounds a vessel 23 containing the core 24, the vessel being suspended under a horizontal protective slab 25. The intermediary exchangers, of which only one, designated by the reference 3, has been shown, dip into the interior of the vessel 23 through the slab 25. The pipes 5 and 14 for the introduction of the hot secondary sodium to the steam generator on one hand and the return of this same sodium, cooled, to the pump outlet on the other hand, have been shown, with these pipes crossing through the lateral wall 26 of the building 21 which partly contains the cell 20, via sealed passages 27 and 28 associated with sealing bellows 27a and 28a respectively. At its lower extremity the casing 7 of the steam generator is connected to a rapid drainage tank 29 in case of rupturing of the safety membrane 7a provided at the lower part of the casing 7. A duct 30 connected to a gas - liquid cyclone separator 30a also allows, across the cell 20, the discharge of hydrogen produced in the event of a reaction of the sodium with the water or steam, during a leak from one or more of the pipes in the generator; the increase in pressure produced causes the membrane 7a to rupture above a predetermined threshold.

By way of indication, the invention makes it possible to effect, for a reactor with a power in the order of 1 200 electrical MW, a saving on the sodium pipework of approximately 19 million francs compared with the conventional solutions, the effective volume of the sodium being reduced from 250 to 220 tonnes. The saving on buildings is a further 80 million francs at least.

Figure 5:
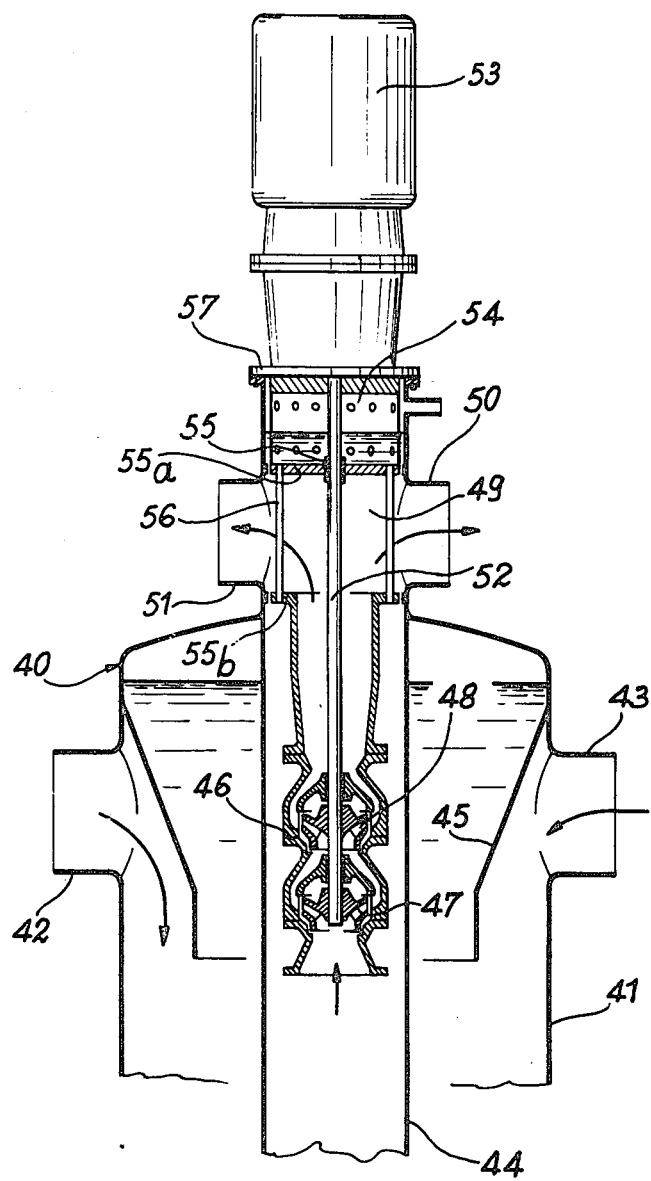
FIG. 5 is a sectional view of another version.

Naturally, it goes without saying that the invention is not limited to the above example of implementation. In particular the circulation pump for the sodium, instead of being connected immediately on the outlet of the central duct, can be mounted directly inside this duct, operating in this case as an immersed pump with one or more superimposed stages. Such a version is shown more particularly in FIG. 5. In this Figure there is again a steam generator 40, comprising an external casing 41 fitted with two lateral apertures 42 and 43 for the supply of sodium arriving from the intermediary exchangers (not shown), and a central duct 44 for returning this sodium. Advantageously, on entering the generator the sodium is distributed around the central duct by an appropriately shaped internal deflector 45 surrounding this duct, between the latter and the internal wall of the casing 41. In this central duct 44 the circulation pump 46 is mounted, comprising in the example here two stages 47 and 48 in series, pumping into a collector-diffuser 49, to which two return pipes 50 and 51 are connected for returning the sodium to the exchangers. The shaft 52 of the drive motor 53 passes above the collector 49 through an expansion tank 54 partly filled with argon and collecting sodium leaks at the level of a guide bearing 55, this leaked sodium together with that coming from the play in the mounting of two support plates 55a and 55b which allow the pump to be dismounted in a single unit, being sent on towards the central duct via communicating pipes 56. All of the pivoting of the pump is suspended beneath a supporting strap 57 which allows this dismounting with the motor 53.

Figure 6:
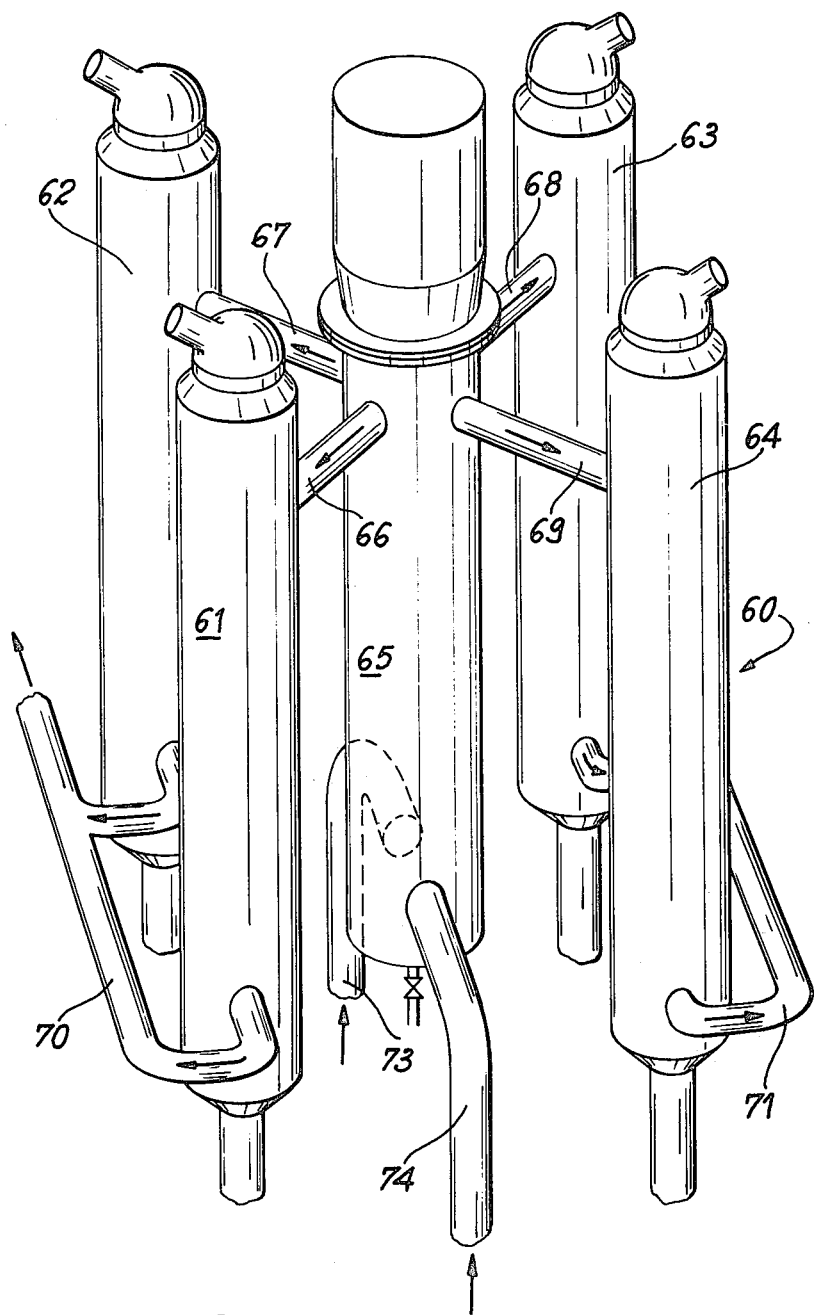
FIG. 6 is a perspective view of a third version.
Figure 7:
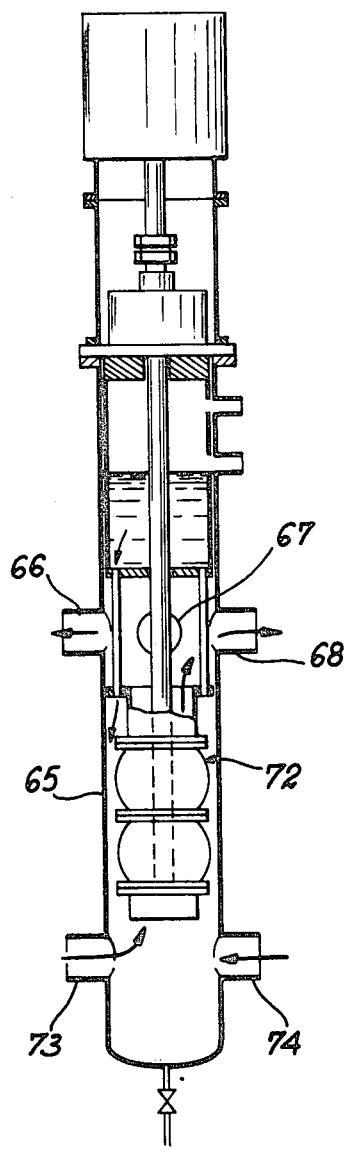
FIGS. 7 and 8 are detail Drawings related to two arrangement possibilities for the pump, adapted for the steam generator shown in FIG. 6.
Figure 8:
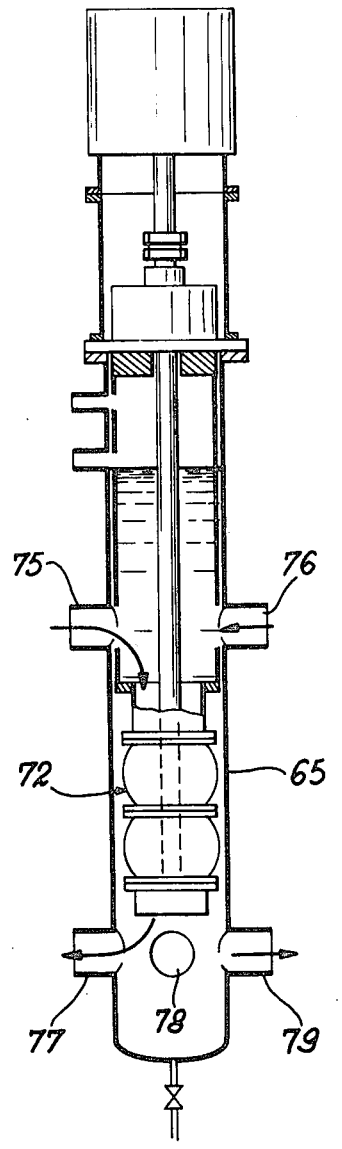

In the previous example the pump is mounted directly in the central duct of the steam generator, which is contained within an external casing surrounding this duct. In another version, the steam generator 60 is subdivided into a multiplicity of separate modules as shown in FIG. 6, these modules 61, 62, 63 and 64 being connected to the central duct 65 by four pipes 66, 67, 68 and 69. At the outlet from the modules the sodium is pumped via two collector ducts 70 and 71 respectively, which connect up the modules into two separate groups, towards the intermediary exchangers. FIG. 7 shows in this case the mounting adopted for the pump 72 mounted in the central duct 65, which is connected at its lower end to two pipes 73 and 74 for admitting hot sodium. It should be noted that the circulation direction of the sodium could equally well be reversed, as shown in FIG. 8, where intake occurs via two ducts 75 and 76 above the pump, and pumping on via four pipes (of which only three: 77, 78 and 79 appear in the Drawing) towards the four generator modules distributed around this central duct.

I claim:

1. In a secondary heat transfer circuit of a nuclear reactor, which circuit comprises at least one steam generator module, at least one intermediate heat exchanger, pipe means interconnecting the steam generator module and the heat exchanger for circulation of a heat transfer liquid between the heat exchanger and the steam generator module, and pump means for effecting said circulation:

the improvement wherein the steam generator module includes a central return duct central to the pump means mounted on the steam generator module for cold heat transfer liquid from the generator and the pump means includes an intake directly connected to said central duct, the steam generator module including at its lower end a rapid drainage pipe system obturated from the steam generator module by a safety membrane.

2. The improvement of claim 1, wherein the heat transfer liquid is liquid sodium.

3. The improvement of claim 1, wherein the pump means is connected to one end of the central duct.

4. The improvement of claim 1, wherein the pump means is an immersed pump, mounted on the inside of the central duct.

5. In a secondary heat transfer circuit of a nuclear reactor, which circuit comprises at least one steam generator module, at least one intermediate heat exchanger, pipe means interconnecting the steam generator module and the heat exchanger for circulation of a heat transfer liquid between the heat exchanger and the steam generator module, and pump means for effecting said circulation:

the improvement wherein the steam generator module includes a central return duct central to the pump mounted on the steam generator module for cold heat transfer liquid from the generator and the pump means includes an intake directly connected to said duct, the pump means including a pump acting directly in the secondary circuit at the outlet of the central duct and an expansion tank arranged above the pump.

6. A nuclear reactor plant comprising in combination:

a secondary heat transfer circuit comprising at least one steam generator module, at least one intermediate heat exchanger, pipe means interconnecting the steam generator module and the heat exchanger for circulation of a heat transfer liquid between the heat exchanger and the steam generator, pump means for effecting said circulation, and a rapid drainage pipe system located at the lower end of the steam generator module and obturated from the steam generator module by a safety membrane, said steam generator module including a duct central to the pump means mounted on the steam generator module for cold heat transfer liquid from the generator, said pump means including an intake directly connected to said duct:

a building;

a nuclear reactor housed in the building; and a sealed cell integral with the building, the seal cell housing the steam generator module and the pump means of the secondary heat transfer circuit, the sealed cell presenting a wall portion through which the pipe means passes leak tightly out of the sealed cell for connection to the intermediate heat exchanger.

7. A nuclear reactor plant according to claim 6, wherein the wall portion of the sealed cell includes sealing bellows through which the pipe means passes.

* * * * *